June 4, 1935. C. H. POYTHRESS 2,003,463
HOE SHANK AND METHOD OF MAKING THE SAME
Filed March 8, 1934
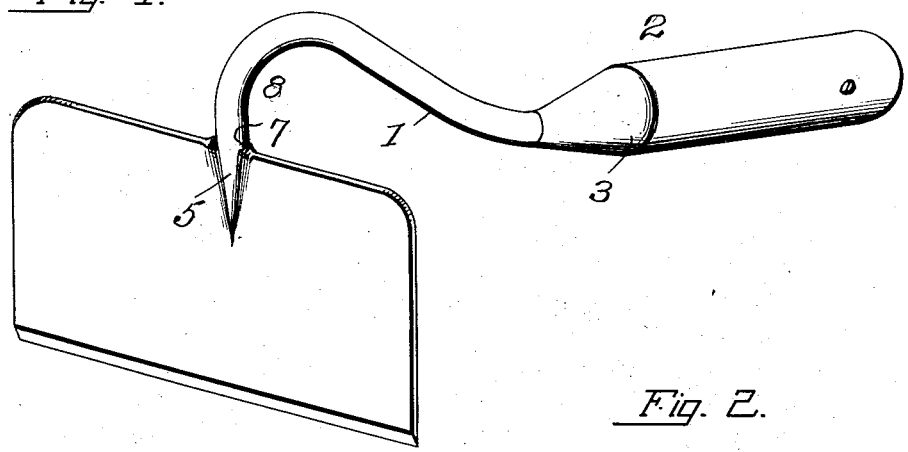
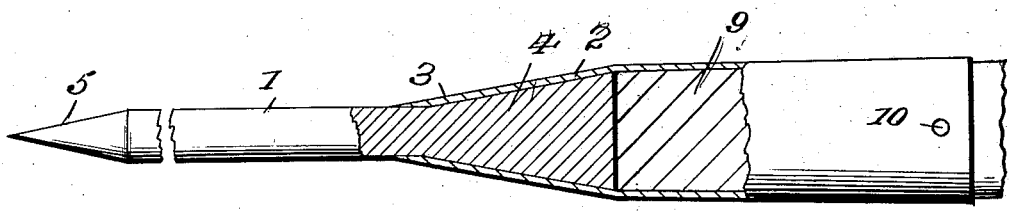
Inventor
C. H. Poythress
Attorney Patented June 4, 1935

2,003,463

UNITED STATES PATENT OFFICE 2,003,463

HOE SHANK AND METHOD OF MAKING THE SAME

Carl H. Poythress, Laurel, Miss.

Application March 8, 1934, Serial No. 714,681

4 Claims. (Cl. 76—109)

This invention relates to a method and means for providing a complete ferrule protection for the end of the wooden handle.

Connections intermediate the blade and wooden handle of a hoe or like implement as heretofore provided include a shank which is secured to the blade by welding or other fastening means, with the opposite end of the shank driven into an opening formed in the end of the wooden handle, combined with an independent ferrule to place over the wooden handle, particularly throughout that portion in which the end of the shank is inserted with a view to protecting the handle against splitting and to some extent against deterioration incident to the character of the material in which the hoe is employed, which has a tendency to eventually rot the handle away at this point.

In this conventional and usual class of connection, the weakest point is at the juncture of the shank with the wooden handle, because the connection is continually under strain during use, and even if the ferrule is serviceable for preventing splitting, the continued use of the hoe so enlarges the opening in the wooden handle in which the shank is inserted as to loosen the connection and often permit the hoe to drop free of the handle. Furthermore, the ferrule does not adequately protect the extreme end of the handle against contact with the dirt, mud and other material which will naturally contact with the end of the handle during the use of the hoe, and as the hoe is rarely, if ever, cleaned after use, the accumulation of this refuse at the end of the handle quickly rots away the handle portion and interferes with, if it does not directly interrupt, the connection. Furthermore, the shank of the hoe as usually employed is given an upward bend substantially in line with the blade so as to permit the complete use of the full height of the blade in the hoeing operation without interference from the handle. Thus there is a tendency to exert a very material strain upon the connection of the shank to the blade and consequent tendency for this connection to break away under continued use of the hoe.

The present invention is designed to overcome these difficulties and to provide a shank which constitutes an appropriate length of solid bar material, combined at one end with a ferrule and formed at the opposite end for an extremely rigid connection with a particularly formed blade. The solid bar length of the shank is formed at one end with an enlarged, conical head, and the ferrule, initially constructed as an independent element, is of hollow, cylindrical, tapered form throughout the greater portion of its length to receive the wooden handle and then reduced on a materially increased taper to an open end of a size accurately corresponding to the diameter of the solid bar length portion of the shank. The headed end of the shank has a shape in correspondence with that of the tapered end of the ferrule so that when the solid bar length of the shank is inserted and passed through the ferrule from the enlarged end of the latter, the headed end acts as a reinforce to the tapered end of the ferrule and substantially fills the ferrule throughout this area. The ferrule at the end embracing the solid portion of the shank is then welded to the shank and the exterior dressed down by machining or the like until the exterior is a substantially unbroken, smooth, integral surface. There is thus no possibility of any water, mud or other refuse reaching the end of the wooden handle through any opening provided between the ferrule and the solid bar portion of the shank.

In the accompanying drawing:—

Figure 1 is a perspective view showing the improved shank, illustrating its connection with the blade and showing a portion of the wooden handle in place.

Figure 2 is an elevation of the shank proper showing the ferrule and headed end of the shank in longitudinal section.

The shank proper includes an appropriate length of round, solid, bar-like material, indicated at 1, and hereinafter referred to as the bar section, and a ferrule 2 also of metal to be secured to and form an integral part of the bar section to receive the wooden handle. The ferrule 2 is of cylindrical form in cross section and throughout the greater portion of its length slightly tapered to afford a wedging cooperation with the wooden handle. The forward end of the ferrule, or that end next the bar section, is also cylindrical in cross section but tapered on a materially increased angle with respect to the taper of the remainder of the ferrule, thereby providing a conical portion 3, the apex end of which is in the form of an opening corresponding approximately to the exterior diameter of the bar section.

One end of the bar section is headed or formed with a conical enlargement having an exterior contour and dimension corresponding to the interior contour and dimension of the conical section 3 of the ferrule. This headed portion 4 of the bar section has a length approximating the longitudinal dimension of the conical section 3 of the ferrule, and in connecting the ferrule and bar section, the free end of the latter is passed through the ferrule and through the opening at the apex end of the section 3 and projected beyond the ferrule section until the head 4 accurately fits within and engages the inner surface of the conical section 3 of the ferrule.

The juncture of the apex end of the conical section 3 of the ferrule and the bar section is then welded, and following the welding operation the exterior portion of the conical section 3 of the ferrule is machined or dressed until this surface merges into the surface of the bar section. In other words, the juncture of the bar section and the apex end of the conical section 3 of the ferrule are integrally united and in effect present an unbroken metallic surface. The headed end of the bar section materially reinforces the conical section 3 of the ferrule, and as this reinforcement occurs immediately adjacent the juncture of the ferrule and bar section, the construction results in a substantially rigid juncture of the bar section and ferrule, presenting maximum strength and insuring that the parts cannot be separated by any usual or unusual strains to which the implement may be subjected.

It is to be understood that the head 4 is of conical shape corresponding to that of the conical section 3 of the ferrule, and that in the application of the bar section to the ferrule, the head end is forced or driven into the conical section 3 of the ferrule in order to secure a wedging cooperation which will materially reinforce the ferrule at this point and insure greater rigidity and strength. The free end of the bar section, i. e. the end opposite the ferrule, is tapered off to present an elongated, conical point 5. The blade 6 of the hoe, which is otherwise of conventional or desired outline or shape, is formed in its upper edge with a recess 7, the recess being formed by offsetting the material of the blade to one side, preferably the front side in use, the shape of which channel corresponds approximately to the contour of one-half of the pointed end 5 of the bar section, considered longitudinally, that is to say, the recess 7 is substantially conical in longitudinal section and approaches the cylindrical in transverse section, the sides of the channel gradually merging into the plane of the blade proper.

The shank, or more particularly the pointed end 5 thereof following the curving of the shank, as illustrated at 8, is placed in the channel 7 and the connection welded on that side of the blade opposite the formed channel. The welding material is either applied or subsequently machined so as to complete on the welded side of the blade a substantial duplicate of the bottom of the channel, i. e. when completely welded the appearance will be that of a socket into which the pointed end 5 of the shank is fitted.

The means employed for connecting the pointed end of the shank to the blade forms the subject-matter of a co-pending application filed July 19, 1934, Serial No. 736,076.

A wooden handle 9 is inserted in the ferrule to a point in contact with the head 4 and may, if desired, be secured by a nail 10 or like element driven through an opening 11 formed in the ferrule and taking into the handle.

The hoe as a whole provides an extremely rigid, economically produced implement. By the method of associating the shank portions, the possibility of any damp earth or like material reaching the bottom of the wooden handle is entirely prevented. Thus one of the most serious and frequent causes of the rotting of the handle is obviated. The connection between the bar portion and ferrule is of maximum strength and rigidity.

What is claimed is:—

1. A method of constructing the shank portion of a hoe or like implement, consisting in providing a handle-receiving ferrule with a sharply conical end, providing a bar section, forming on the bar section an enlarged head to wedge within the sharply tapered section of the ferrule, with the bar section projecting beyond the ferrule, welding the bar section and ferrule at their juncture, and forming the free end of the bar section with a tapered portion for cooperation with the blade of the implement.

2. A method of forming a shank for a hoe or the like, consisting in providing a ferrule with a sharply tapered end portion, forming a bar section with an enlarged head to fit within and have wedging cooperation with the sharply tapered portion of the ferrule, with the bar section projecting beyond the ferrule, welding the juncture between the ferrule and bar section, and removing the excess material at such juncture to cause the exterior of the ferrule to merge into the exterior of the bar section.

3. A shank for a hoe including a bar section of appropriate length, a ferrule formed with a slightly conical hollow handle-receiving portion and a sharply tapered hollow part in advance of the handle-receiving portion, one end of the bar section being enlarged and shaped to correspond with the interior of the sharply tapered portion of the ferrule, said bar section fitting within the sharply tapered portion of the ferrule to reinforce and brace the same and extending beyond the ferrule and terminating in a formed end for connection with the blade, the juncture of the bar section and ferrule at the forward end of the latter being permanently secured and presenting a practically unbroken exterior surface.

4. A shank for a hoe including a bar section of appropriate length, a ferrule of hollow construction and open at both ends, one end of the ferrule being slightly tapered for the reception of a handle, the remaining length of the ferrule being sharply tapered, the shank being in part seated within the sharply tapered portion of the ferrule and being formed within the ferrule to correspond in size and shape with the interior of such sharply tapered portion, the exterior of the ferrule at its juncture with the shank being permanently secured to the shank and merging into the surface of the shank.

CARL H. POYTHRESS.